US012791874B2

(12) United States Patent
Song et al.

(10) Patent No.: US 12,791,874 B2
(45) Date of Patent: Nov. 10, 2026

(54) EXTENDED DEPTH OF FOCUS LENSES HAVING MULTIPLE WAVE PLATE

(71) Applicant: IUCF-HYU (INDUSTRY-UNIVERSITY COOPERATION FOUNDATION HANYANG UNIVERSITY), Seoul (KR)

(72) Inventors: Seok Ho Song, Seoul (KR); Seung Min Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 451 days.

(21) Appl. No.: 18/285,171

(22) PCT Filed: Mar. 21, 2022

(86) PCT No.: PCT/KR2022/003865
§ 371 (c)(1),
(2) Date: Sep. 29, 2023

(87) PCT Pub. No.: WO2022/211337
PCT Pub. Date: Oct. 6, 2022

(65) Prior Publication Data

US 2024/0184143 A1 Jun. 6, 2024

(30) Foreign Application Priority Data

Apr. 2, 2021 (KR) ........................ 10-2021-0043100

(51) Int. Cl.

| | |
|---|---|
| ***G02C 7/06*** | (2006.01) |
| ***G02B 5/30*** | (2006.01) |
| ***G02B 27/00*** | (2006.01) |

(52) U.S. Cl.
CPC ............ *G02C 7/06* (2013.01); *G02B 5/3083* (2013.01); *G02B 27/0075* (2013.01); *G02C 2202/24* (2013.01)

(58) Field of Classification Search
CPC .... G02B 5/3083; G02B 27/0075; G02C 7/06; G02C 2202/24
(Continued)

(56) References Cited

U.S. PATENT DOCUMENTS

| | | | |
|---|---|---|---|
| 9,753,193 | B2 | 9/2017 | Tabirian et al. |
| 10,191,191 | B2 | 1/2019 | Tabirian et al. |

(Continued)

FOREIGN PATENT DOCUMENTS

| | | | |
|---|---|---|---|
| JP | 08-507158 | A | 7/1996 |
| JP | 2013-519927 | A | 5/2013 |

(Continued)

OTHER PUBLICATIONS

International Search Report for PCT/KR2022/003865 dated Jun. 30, 2022 [PCT/ISA/210].

*Primary Examiner* — Bumsuk Won
*Assistant Examiner* — Grant A Gagnon
(74) *Attorney, Agent, or Firm* — Sughrue Mion, PLLC

(57) ABSTRACT

Disclosed is an extended depth-of-focus lens having multiple waveplates. More particularly, the extended depth-of-focus lens having multiple waveplates includes a lens having an incident surface and an opposite surface thereof; a lens waveplate made of a birefringent material, and disposed on the lens in a direction of a central axis of the lens to have phase distribution to increase the number of focal points; and a phase distortion waveplate made of a birefringent material, and disposed on the lens in a direction of a central axis of the lens to have a phase distribution to extend a depth of focus, wherein, in the waveplate layer, phases between (Continued)

neighboring lens waveplates, phases between phase distortion waveplates or phases between a lens waveplate and a phase distortion waveplate have opposite phase signs such that they are in a complementary relation.

16 Claims, 16 Drawing Sheets

(58) Field of Classification Search
USPC .......................................................... 351/159
See application file for complete search history.

(56) References Cited

U.S. PATENT DOCUMENTS

| | | | | |
|---|---|---|---|---|
| 2020/0025987 | A1 | 1/2020 | Tabirian et al. | |
| 2021/0405374 | A1 * | 12/2021 | Komanduri .......... | G02B 27/283 |

FOREIGN PATENT DOCUMENTS

| | | | |
|---|---|---|---|
| JP | 2014-215568 | A | 11/2014 |
| KR | 10-2009-0117399 | A | 11/2009 |
| WO | 2017/130111 | A1 | 8/2017 |

* cited by examiner

【FIG. 1】
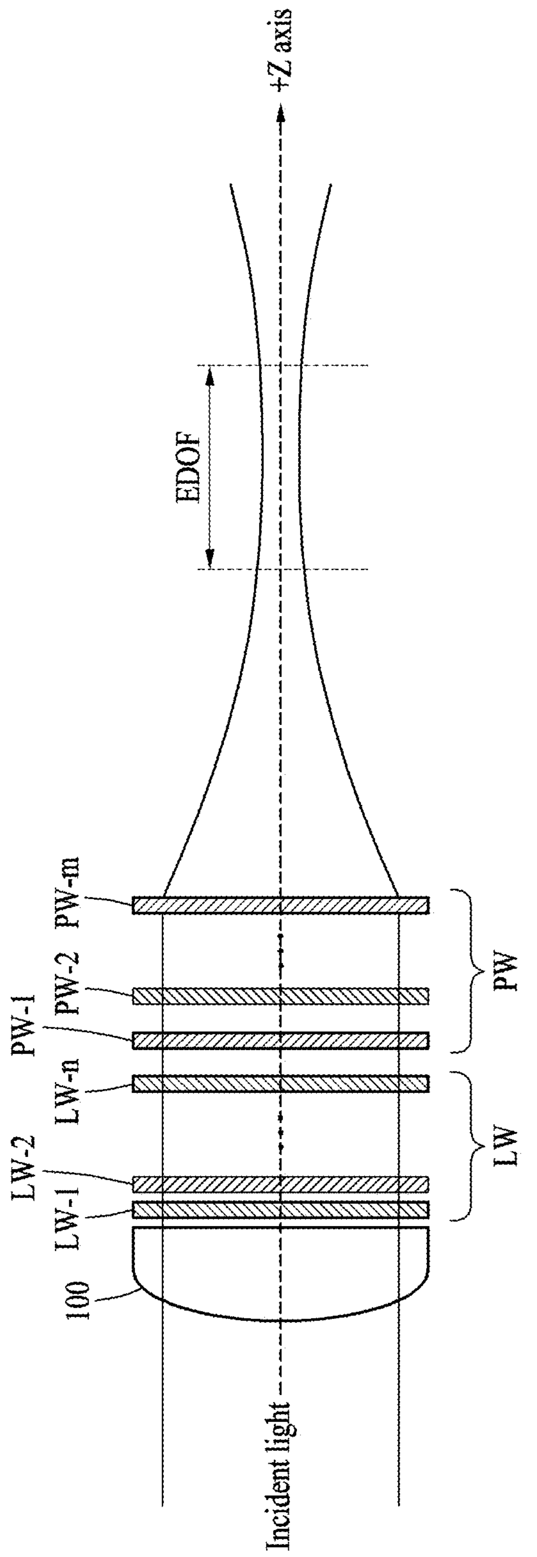

【FIG. 2】
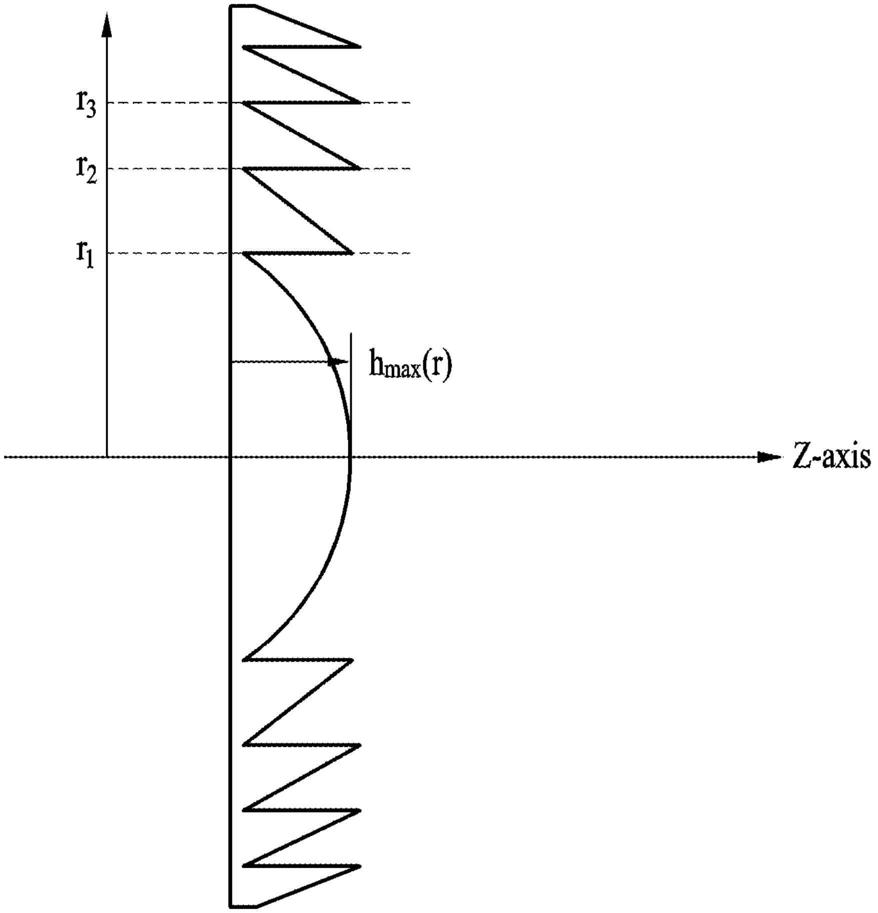

【FIG. 3】
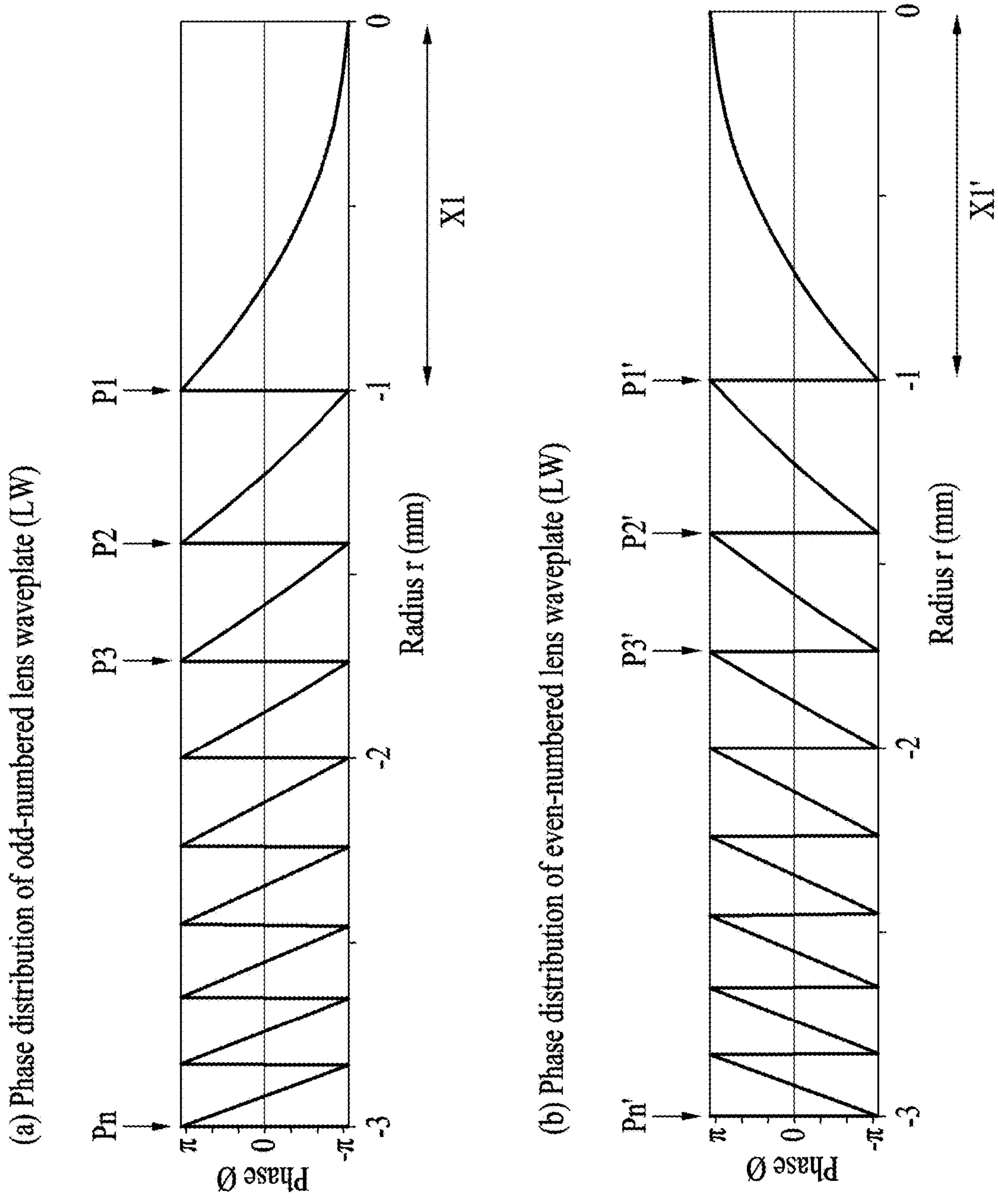

【FIG. 4】
Phase distribution of odd-numbered lens waveplate (LW)
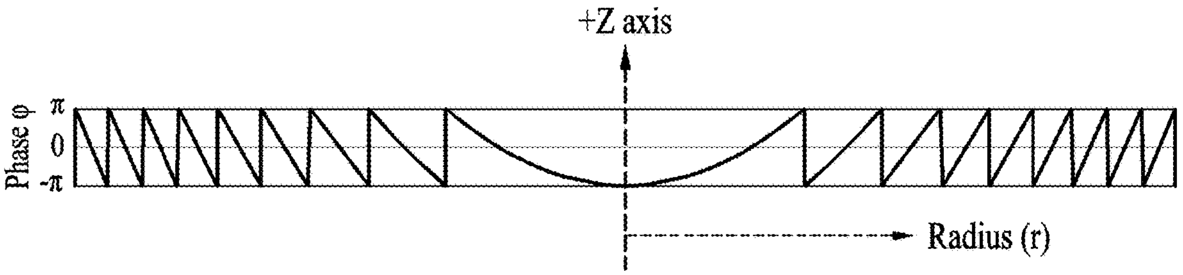
(a)
Phase distribution of even-numbered lens waveplate (LW)
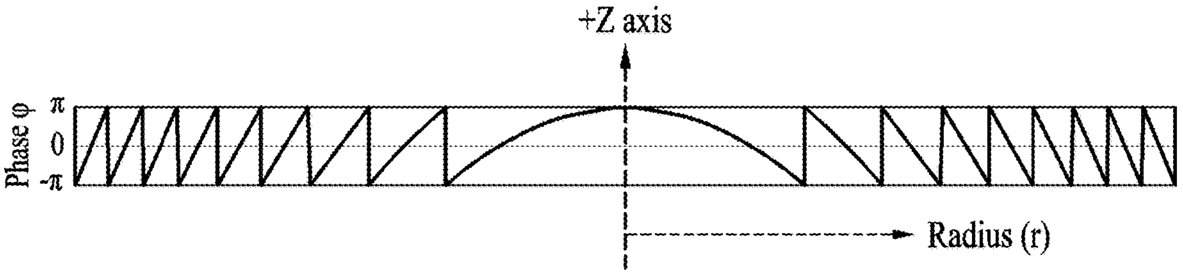
(b)

【FIG. 5】
Phase distribution of odd-numbered phase distortion waveplate (PW)
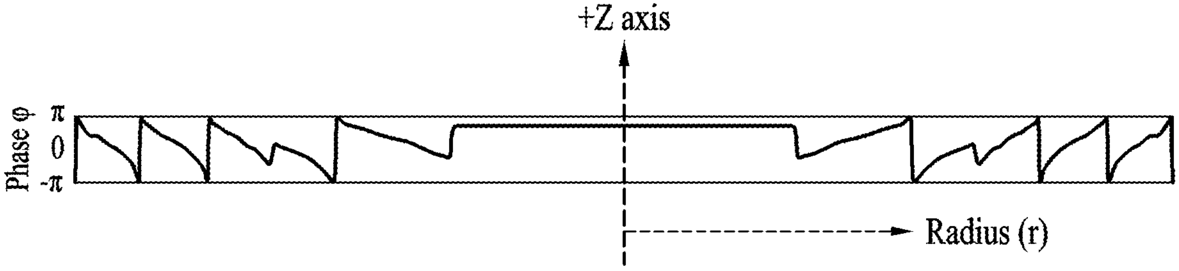
(a)
Phase distribution of even-numbered phase distortion lens waveplate (PW)
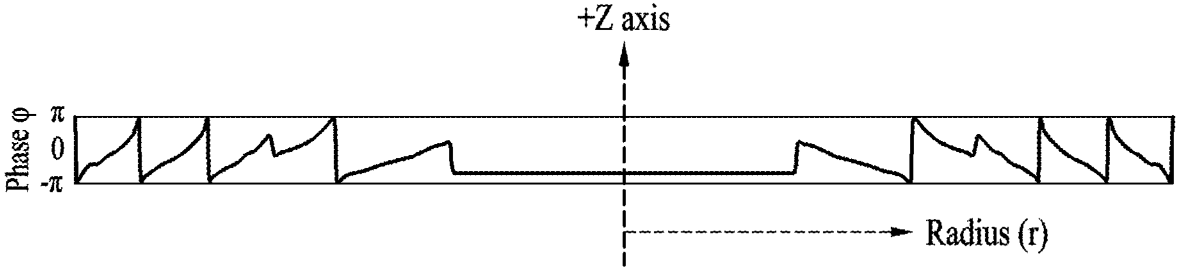
(b)

【FIG. 6】
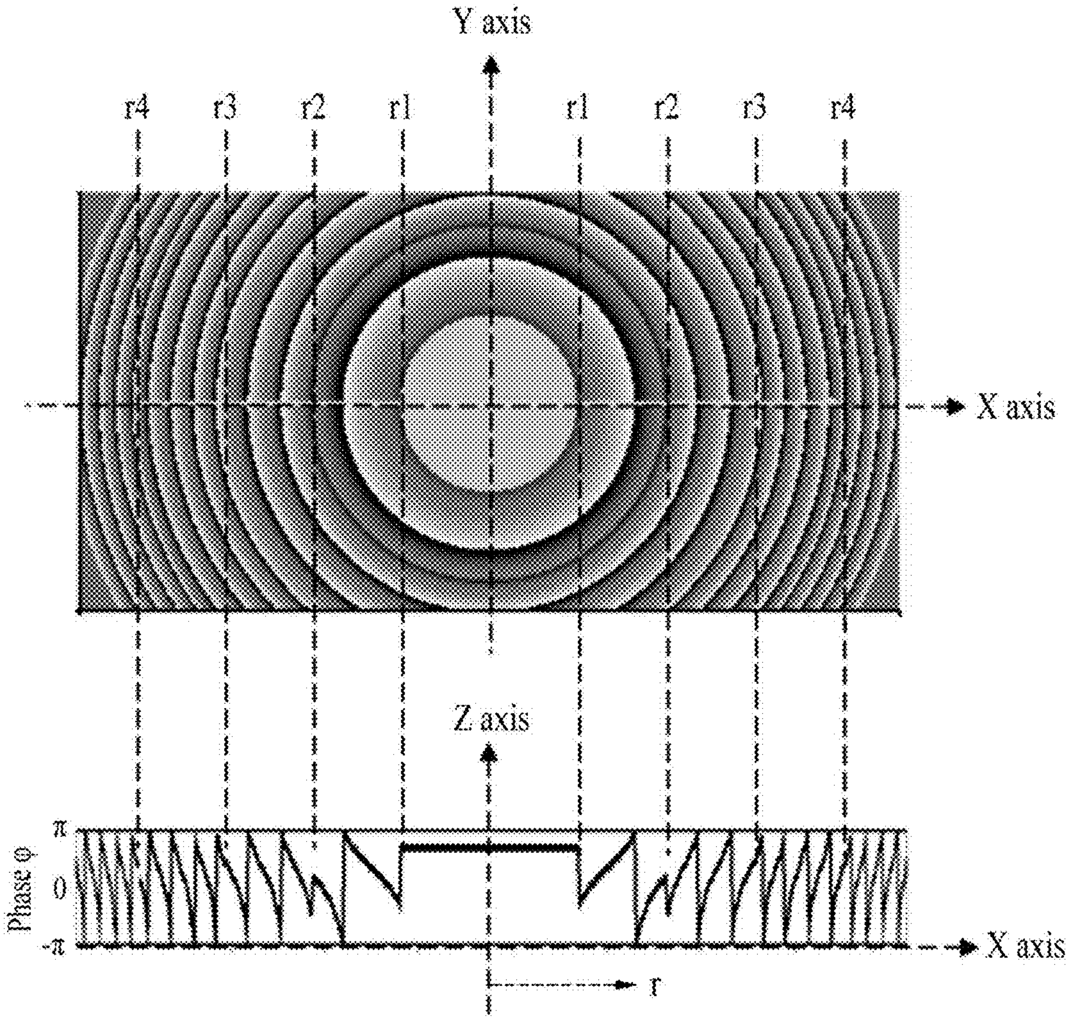

【FIG. 7】
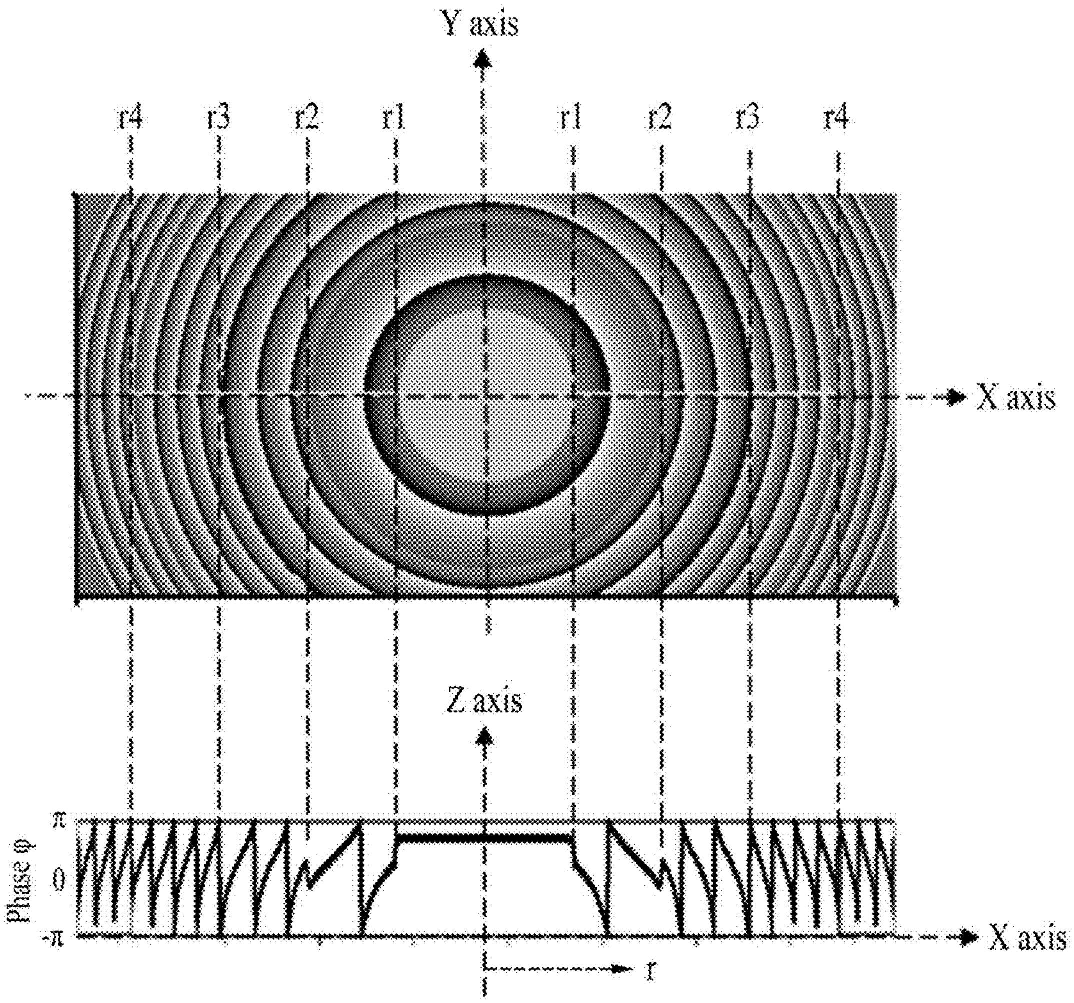

【FIG. 8】
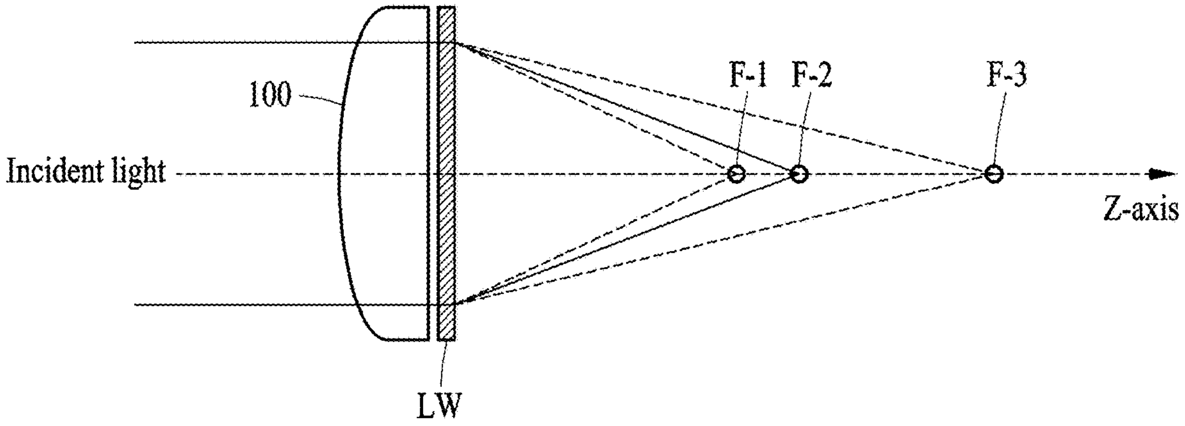

【FIG. 9】
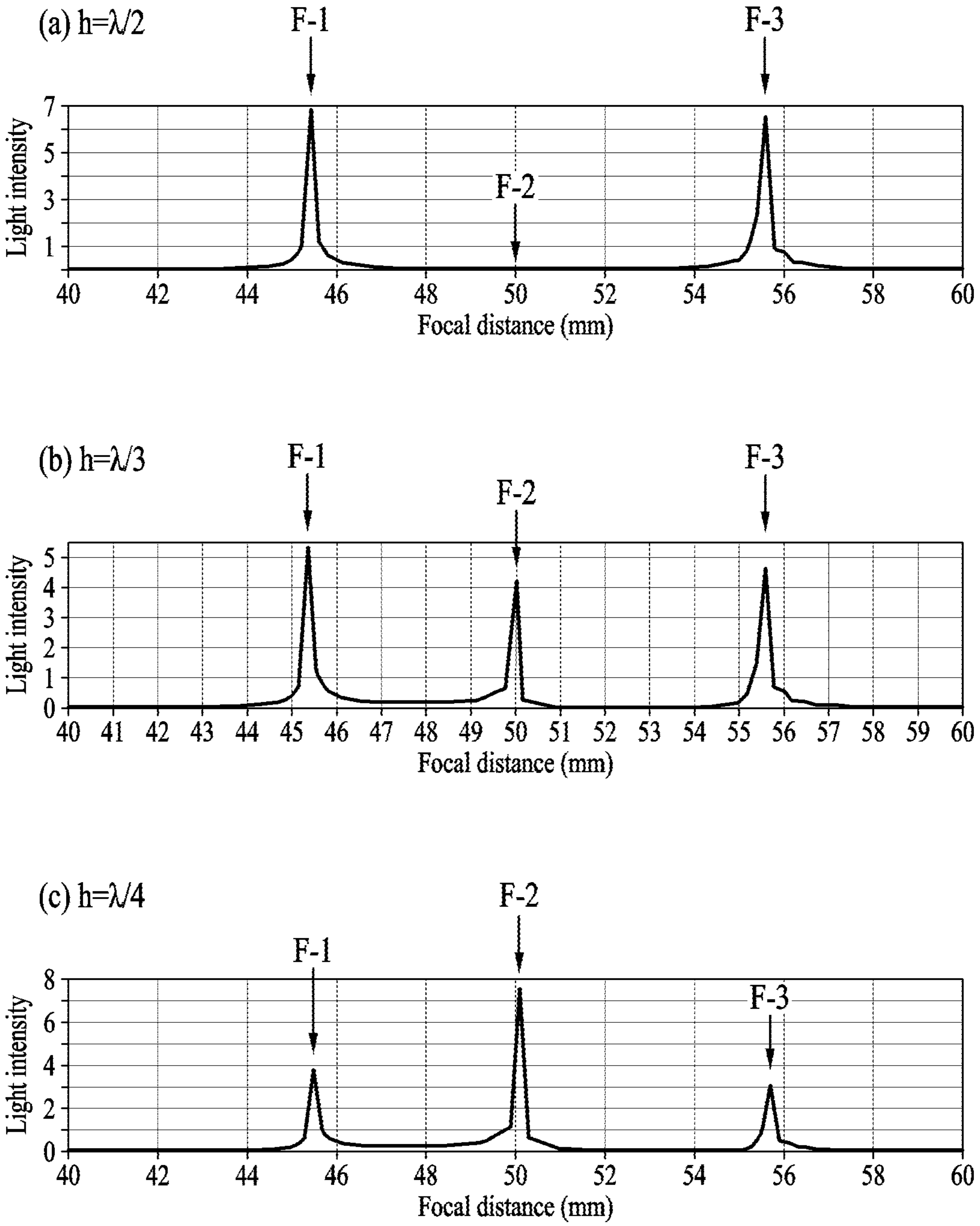

【FIG. 10】
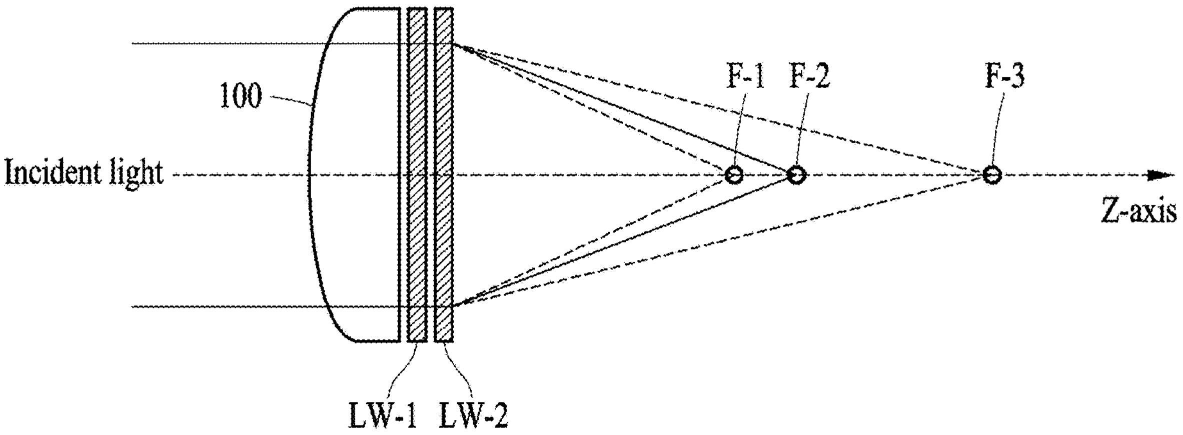

【FIG. 11】
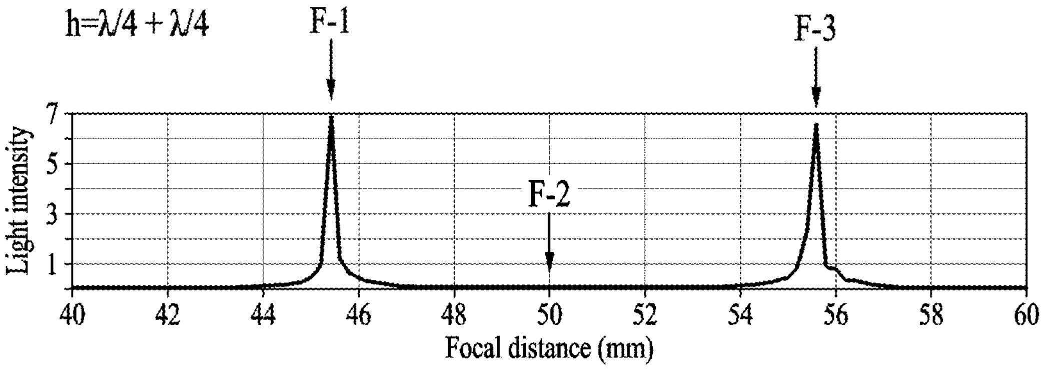

【FIG. 12】
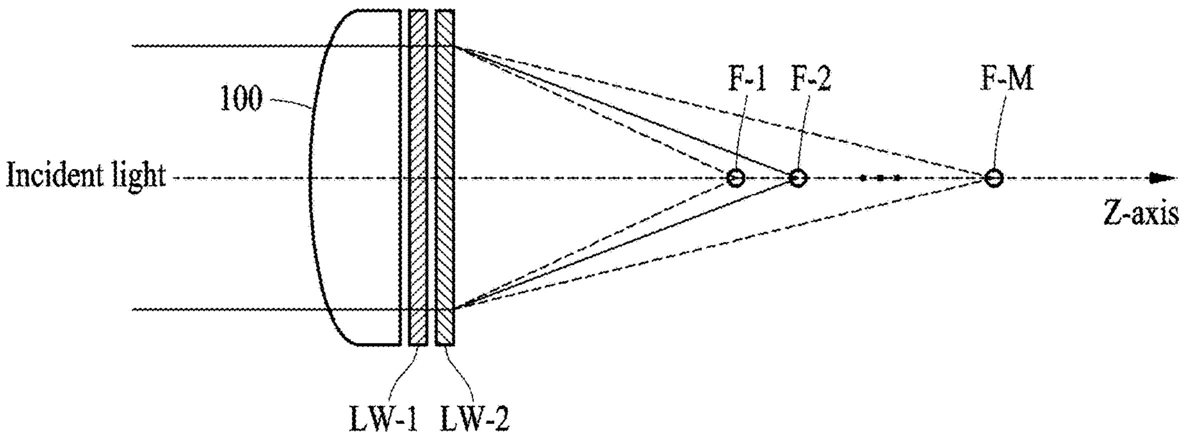

【FIG. 13】
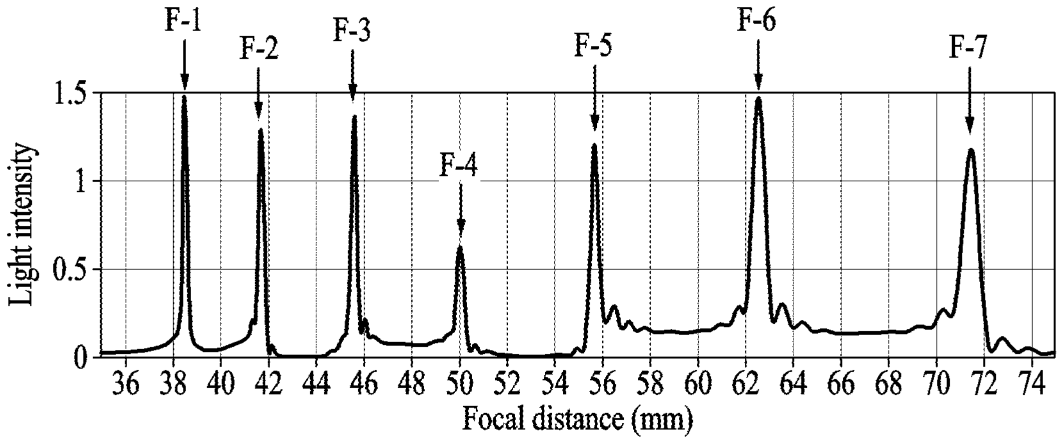

【FIG. 14】
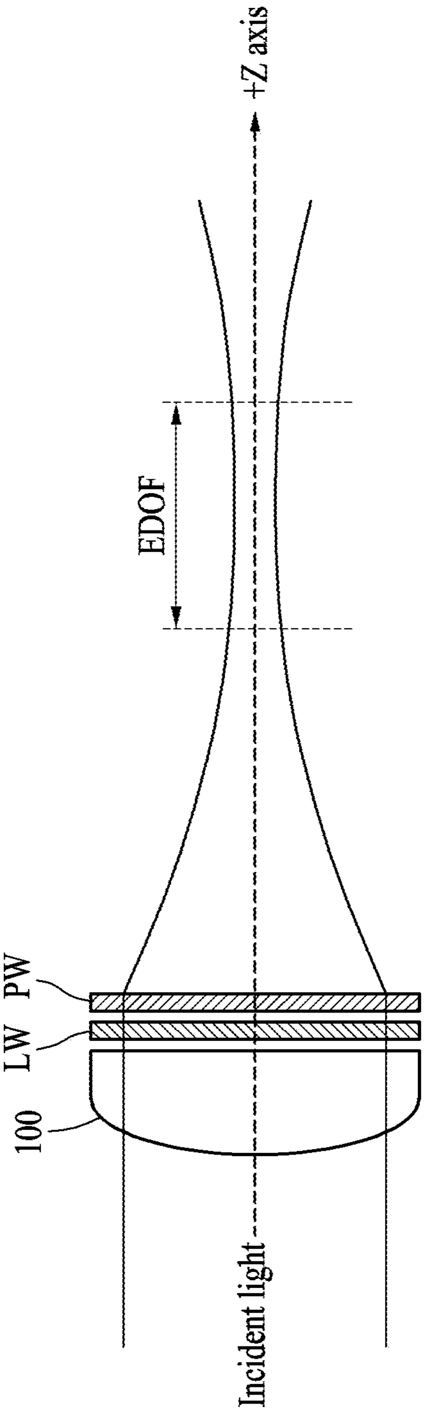

【FIG. 15】
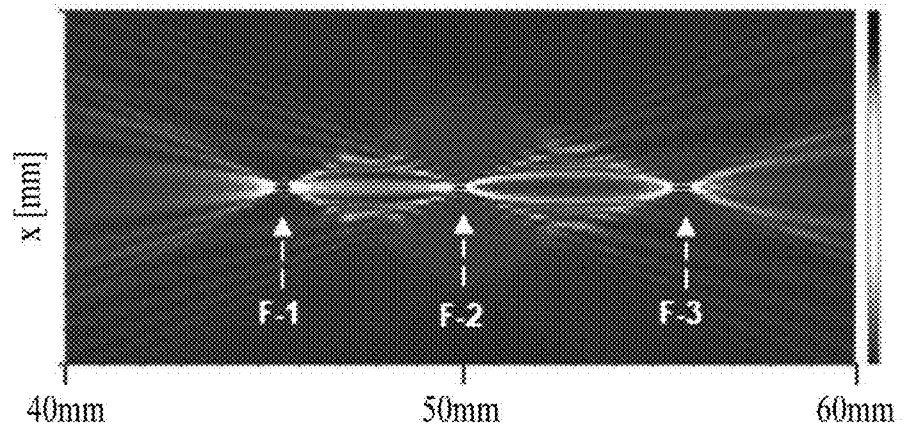
(a)
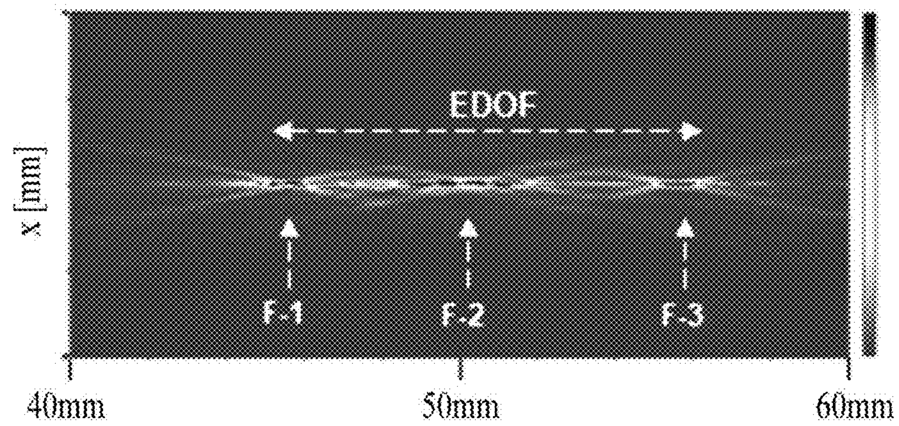
(b)
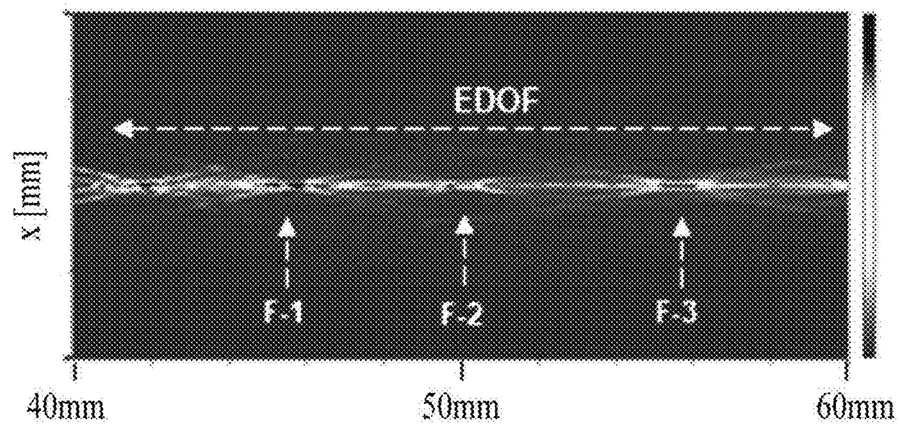
(c)

【FIG. 16】
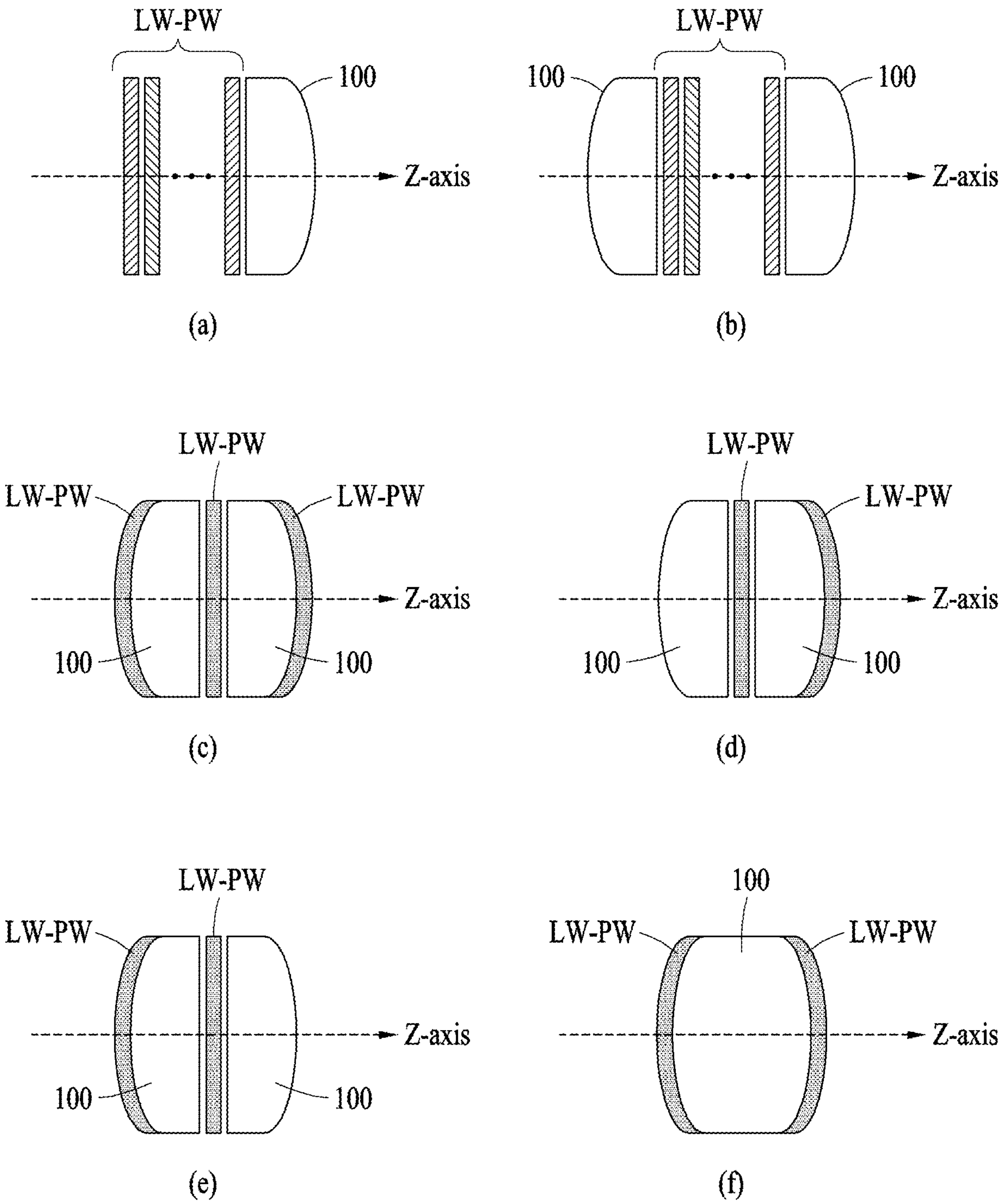

EXTENDED DEPTH OF FOCUS LENSES HAVING MULTIPLE WAVE PLATE

CROSS-REFERENCE TO RELATED APPLICATION

This application is a National Stage Entry of PCT International Application No. PCT/KR2022/003865, which was filed on Mar. 21, 2022, and which claims priority to Korean Patent Application No. 10-2021-0043100, filed on Apr. 2, 2021 in the Korean Intellectual Property Office, the disclosure of which is incorporated herein by reference.

TECHNICAL FIELD

The present invention relates to an extended depth-of-focus lens having multiple waveplates, and more particularly to an extended depth-of-focus lens having multiple waveplates, the multiple waveplates provided with a lens waveplate serving to increase the number of focal points on the front or back of a lens and a phase distortion waveplate serving to expand the depth of focus.

BACKGROUND ART

Examples of common vision-impairing diseases include myopia and hyperopia. These diseases are usually due to an imbalance between the length of the eye and the focus of the eye's optical elements. Myopia focuses on the front of the retina, and hyperopia focuses on the back of the retina. Myopia typically occurs because the axial length of the eye grows longer than the focal length of the eye's optical components, that is, the eye grows too long. Hyperopia typically occurs because the axial length of the eye is too short compared to the focal length of the eye's optical components, that is, the eye does not grow long enough.

The ability to adjust focal length, i.e., to focus on near and distant objects without relying on changes in focal length, can be improved by using intraocular multifocal lenses or contact lenses. Multifocal lenses have different focal lengths for near and far vision.

Among the techniques for manufacturing multifocal diffractive lenses, a method involving a diffractive waveplate element made of a birefringent material is known. This method has the advantage of a relatively easy manufacturing process and low cost.

As a prior art regarding a multifocal lens having a diffractive waveplate element, there is U.S. Pat. No. 9,753,193 (METHODS AND APPARATUS FOR HUMAN VISION CORRECTION USING DIFFRACTIVE WAVEPLATE LENSES).

Meanwhile, a technology that expands the depth of focus to continuously obtain a focal area from far vision to near vision has been proposed as an alternative to a multifocal lens with a discontinuous focal length. The extended depth of focus (EDOF) can be defined as the area where a clear image is formed.

However, conventionally designed diffractive waveplate EDOF lenses have an overall structure of a single thin film layer, so the fast and slow axis arrays of birefringent materials arranged in a single thin film layer should be properly arranged so as to form the extended depth of focus while minimizing phase distribution and optical aberration. This process is very complicated.

DISCLOSURE

Technical Problem

Therefore, the present invention has been made in view of the above problems, and it is one object of the present invention to provide an extended depth-of-focus lens having multiple waveplates that can expand the depth of focus while increasing the number of focal points by placing a lens waveplate and a phase distortion waveplate in a lens.

Technical Solution

In accordance with an aspect of the present invention, the above and other objects can be accomplished by the provision of an extended depth-of-focus lens having multiple waveplates, the extended depth-of-focus lens including: a lens having an incident surface and an opposite surface thereof; a lens waveplate made of a birefringent material, and disposed on the lens in a direction of a central axis of the lens to have phase distribution to increase the number of focal points; and a phase distortion waveplate made of a birefringent material, and disposed on the lens in a direction of a central axis of the lens to have a phase distribution to extend a depth of focus, wherein, in the waveplate layer, phases between neighboring lens waveplates, phases between phase distortion waveplates or phases between a lens waveplate and a phase distortion waveplate have opposite phase signs such that they are in a complementary relation.

Here, a complementary relation of phases means that the slope signs of phase values between two waveplates are opposite to each other. A case in which the phase values of two waveplates are $\Phi$ and $-\Phi$, respectively, where the magnitude of the absolute value is the same and only the sign is opposite or a case in which the magnitude of the absolute value is different and the sign is opposite is also an example wherein the phases are in a complementary relation. In the present invention, only the complementary relationship wherein the phase values of neighboring two waveplates have opposite signs, such as $\Phi$ and $-\Phi$, respectively, is described. However, a case wherein two neighboring waveplates have opposite slope signs of phase values in a phase range of $-\pi$ to $+\pi$ may also be applied.

According to an embodiment, light intensity at a location where a focal point is formed may change as a thickness of the lens waveplate or the phase distortion waveplate changes.

According to an embodiment, when a thickness of the lens waveplate or the phase distortion waveplate is adjusted such that light intensity at a location where one focal point is formed becomes 0, the number of focal points may change.

According to an embodiment, the number of focal points may be calculated by Equation 1 below:

$$N=4\times 2^{m-1}-1 \quad \text{(Equation 1)}$$

where N represents the number of focal points, and m represents the number of lens waveplates.

According to an embodiment, the location of the focal point may be calculated according to Equation 2 below depending upon the number of the lens waveplates:

$$\frac{1}{f_N}=\frac{1}{f_{FL}}+\frac{1}{f_{LW-1}}+\frac{1}{f_{LW-2}}+\dots\frac{1}{f_{LW-n}} \quad \text{(Equation 2)}$$

where $f_N$ represents a focal distance after passing a last lens waveplate, and $f_{LW-n}$ represents a focal distance of each lens waveplate.

According to an embodiment, in phase distribution of the lens waveplate or the phase distortion waveplate, a location where a focal point is formed may change as a phase section X between a center of the lens and points, where a phase rapidly changes, changes.

Here, in the same phase section (X) between neighboring lens waveplates, between phase distortion waveplates or between a lens waveplate and a phase distortion waveplate, a section where a phase at another waveplate decreases may appear when a phase at one waveplate increases.

According to an embodiment, in phase distribution of the phase distortion waveplate, a phase may be consistently formed in a phase section (X1) between a center of the lens and a point where a first phase changes rapidly.

According to an embodiment, two or more lens waveplates or phase distortion waveplates may be stacked and disposed.

According to another embodiment, the lens waveplate and the phase distortion waveplate may be alternately disposed.

According to an embodiment, the lens waveplate or the phase distortion waveplate may be disposed on an incident surface or opposite surface of the lens having a curved shape and may have a shape corresponding to the curved shape.

In accordance with another aspect of the present invention, there is provided an extended depth-of-focus lens having multiple waveplates, the extended depth-of-focus lens including: a lens having an incident surface and an opposite surface thereof; and a waveplate layer made of a birefringent material, composed of a lens waveplate for increasing the number of focal points; and a phase distortion waveplate stacked on the lens waveplate to have phase distribution for extending a depth of focus, and disposed on the lens in a direction of a central axis of the lens, wherein, in the waveplate layer, phases between neighboring lens waveplates or phase distortion waveplates or between a lens waveplate and a phase distortion waveplate phase have opposite phase signs such that they are in a complementary relation.

According to an embodiment, when the waveplate layer is disposed on both an incident surface of the lens and an opposite surface thereof, phases of lens waveplates or phase distortion waveplates facing each other in each waveplate layer with the lens interposed therebetween have opposite phase signs such that they are in a complementary relation.

According to an embodiment, the lens may include: a first lens whose incident surface has a curved shape and whose opposite surface has a flat shape; and a second lens whose surface facing the first lens has a flat shape and whose opposite surface has a curved shape, wherein the waveplate layer is disposed at any one or more positions of on an incident surface of the first lens, between the first and second lenses, and on an opposite surface of the second lens.

According to an embodiment, among the waveplate layers, one or more waveplate layers may be disposed on the incident surface of the first lens, and remaining one or more waveplate layers may be disposed between the first and second lenses or on the opposite surface of the second lens.

According to another embodiment, among the waveplate layers, one or more waveplate layers may be disposed between the first and second lenses, and remaining one or more waveplate layers may be disposed on the opposite surfaces of the second lens.

Advantageous Effects

In accordance with the present invention, the number of focal points and the depth of focus can be increased in proportion to the number of waveplates. By using this, an ophthalmic lens suitable for a user's disease, such as an intraocular lens (IOL) for the treatment of myopia and hyperopia, and a contact lens can be easily manufactured.

In addition, the present invention can be applied not only to vision correction but also to industrial fields, such as microscopes and cameras, requiring a multifocal lens.

In the present invention, the total number of waveplates, the curvature of a refractive lens surface, the refractive index distribution of each waveplate and the like can be varied to achieve the refractive compensation required for distance and near vision together with other lenses in a visual system.

Further, the number of focal points can be adjusted within the maximum number of focal points because the degree of light intensity changes at the location where a focal point is formed when the thickness of a waveplate is changed.

DESCRIPTION OF DRAWINGS

FIG. 1 illustrates an overall configuration of an extended depth-of-focus lens having multiple waveplates according to an embodiment of the present invention.

FIG. 2 illustrates a cross-section of an existing diffractive lens.

FIG. 3 illustrates the phase distribution of a lens waveplate according to an embodiment of the present invention.

FIG. 4 illustrates the overall phase distribution of the lens waveplate shown in FIG. 3.

FIG. 5 illustrates the phase distribution of a phase distortion waveplate according to an embodiment of the present invention.

FIG. 6 illustrates the phase distribution of a phase distortion waveplate according to another embodiment of the present invention.

FIG. 7 illustrates the phase distribution of a phase distortion waveplate according to still another embodiment of the present invention.

FIG. 8 illustrates a state in which one lens waveplate is disposed on a lens.

FIG. 9 illustrates the focal point locations and light intensity distribution depending upon a thickness change of the lens waveplate of FIG. 8.

FIG. 10 illustrates a state where two lens waveplates are stacked and disposed on a lens, but not in complementary relation.

FIG. 11 illustrates the locations and light intensity distribution of focal points when each thickness of the waveplate of FIG. 10 is $\lambda/4$.

FIG. 12 illustrates a state in which two lens waveplates in a complementary relationship are stacked and disposed on a lens.

FIG. 13 illustrates the location of focal points and light intensity distribution when each thickness of the waveplates of FIG. 12 is $\lambda/4$.

FIG. 14 illustrates a state in which one lens waveplate and one phase distortion waveplate are stacked and disposed on a lens according to an embodiment of the present invention.

FIG. 15(*a*) illustrates the light intensity distribution when only one lens waveplate is disposed on a lens, FIG. 15(*b*) illustrates the light intensity distribution when one lens waveplate and one phase distortion waveplate, which are not in a complementary relation, are disposed on a lens, and FIG. 15(*c*) illustrates the light intensity distribution when one lens waveplate and one phase distortion waveplate which are in complementary relation are disposed on a lens.

FIG. 16 illustrates various embodiments of the present invention in which a lens waveplate and a phase distortion waveplate are disposed on a lens.

BEST MODE

Hereinafter, an extended depth-of-focus lens having multiple waveplates according to a preferred embodiment will be described in detail with reference to the accompanying drawings. Here, the same symbols are used for the same components, and repetitive descriptions and detailed descriptions of known functions and configurations that may unnecessarily obscure the gist of the invention are omitted. Embodiments of the invention are provided to more completely explain the present invention to those with average knowledge in the art. Therefore, the shapes and sizes of elements in the drawings may be exaggerated for clearer explanation.

FIG. 1 illustrates an overall configuration of an extended depth-of-focus lens having multiple waveplates according to an embodiment of the present invention, and FIG. 2 illustrates a cross-section of an existing diffractive lens.

Referring to FIG. 1, the extended depth-of-focus lens having multiple waveplates according to an embodiment of the present invention includes lens waveplates (LW-1~LW-n) and phase distortion waveplates (PW-1~PW~m). Here, at least one lens waveplate LW and at least one phase distortion waveplate PW may be respectively included. Meanwhile, the lens 100 is a refractive lens and includes an incident surface, on which light is incident, and an opposite surface thereof. The direction of progress of incident light is in the direction of the central axis (z-axis) of the lens 100.

According to an embodiment of the present invention, the lens waveplate LW and the phase distortion waveplate PW are disposed on the lens 100 in the same direction as the central axis (z-axis) of the lens 100. In this description, the term "dispose" includes not only the case where two or more waveplates (LW, PW) are stacked and arranged in order, but also the case where the waveplates (LW, PW) are disposed on the lens 100 to be spaced from each other due to the lens 100 interposed therebetween. The disposed lens waveplate LW or phase distortion waveplate PW may be attached to the lens 100 or attached to each other. Another embodiment in which the lens waveplate LW and the phase distortion waveplate PW are disposed in the lens 100 will be described below.

In an embodiment of the present invention, the lens waveplate LW is intended to increase the number of focal points, and the phase distortion waveplate PW is intended to expand the depth of focus. Each waveplate (LW, PW) has a phase distribution to perform the above-described functions. More details will be provided below.

The lens waveplate LW is an optical element that changes the polarization state of light and is a lens (waveplate lens) made of a birefringent material. The lens waveplate LW is also called a phase retardation plate. In a phase retardation plate, a polarization direction in which the speed of light is fast is called a fast axis, and a polarization direction which has an axis perpendicular to the fast axis and whose light speed is slow is called a slow axis. The phase retardation plate includes a Half Wave Plate (HWP) that retards the phase of $\lambda/2$; and a Quarter Wave Plate (QWP) that retards the phase of $\lambda/4$. For example, when a linearly polarized beam passes at an angle of $\theta$ with respect to a fast axis of the HWP, it is rotated and polarized by $2\theta$, and when the linearly polarized beam passes at an angle of 45 degrees with respect to a fast axis of the QWP, a circularly polarized beam is produced. The polarization conversion technology of linearly polarized or circularly polarized beams that have passed through HWP and QWP is a known technology, so a detailed description thereof will be omitted.

Meanwhile, as shown in FIG. 2, a diffractive lens, commonly known as a Fresnel lens, has a sawtooth shape as the radius increases from the center of the diffractive lens, and has a phase distribution as shown in Equation 1 below depending on the size of the radius:

$$\Phi(r) = 2\pi \times \left\{ j - \frac{r_j^2}{(2\lambda F)} \right\} \quad \langle\text{Equation 1}\rangle$$

where $r_j$ represents the jth radius based on the center of a diffractive lens, $\lambda$ represents the wavelength length of incident light, and F represents the central focal distance of a diffractive lens.

In addition, as a phase distribution in Equation 1 moves away from a diffractive lens, multiple focal points are formed as in Equation 2 below:

$$F_m = \frac{F}{m} \quad \langle\text{Equation 2}\rangle$$

where m is a diffraction order of a diffractive lens.

Meanwhile, unlike the shape of the Fresnel lens described above, the lens waveplate LW according to the present invention is formed in an annular shape and is manufactured to have a certain thickness depending on a distance from the center of the lens waveplate LW, thereby performing the function of a Fresnel lens. Here, the arrangement directions of fast and slow axes of the waveplate according to the present invention are adjusted when incident light has left-handed circular polarization or right-handed circular polarization (RHCP), so a phase distribution with multiple focal points similar to Equations 1 and 2 is formed.

In relation to a manufacturing method of the lens waveplate LW according to an embodiment of the present invention, a related research paper "J-H. Kim et al. "Fabrication of ideal geometric-phase holograms with arbitrary wavefronts", Optica Vol. 2, No. 11, November (2015)" may be referenced. According to the related preceding research paper, the lens waveplate LW is manufactured by forming a pattern to control optical axis rotation at its local location. Here, examples of a method for patterning the optical axis rotation of an anisotropic material that makes up the lens waveplate LW include a rubbing method of forming fine grooves on the surface of a lens waveplate LW by mechanical means; a photo-alignment method of arranging in a certain direction according to the polarization of incident light; and the like.

The phase distortion waveplate PW may be manufactured to have a phase distribution to extend the depth of focus. Some approaches for manufacturing the phase distortion waveplate PW are based on the bulls-eye refractive principle and may include an intermediate region with slightly increased power or may include a phase region that can cause various optical aberrations such as higher-order aberration and spherical aberration, coma and astigmatism. In addition, the phase distortion waveplate PW may be manufactured to expand the depth of focus by being adjusted to have a variety of arbitrary phase distributions.

The lens waveplate LW and phase distortion waveplate PW according to an embodiment of the present invention are made of a transparent material and may be composed of a liquid crystal or, more generally, an anisotropic material such as a reactive mesogen.

As shown in FIG. 1, the lens waveplate LW and the phase distortion waveplate PW may be stacked and disposed on the lens 100 according to an embodiment of the present invention. At this time, the waveplate layer LW-PW is formed due to the lens waveplate LW and the phase distortion waveplate PW.

FIG. 1 illustrates an embodiment wherein the waveplate layer LW-PW is stacked on the opposite side of the lens 100. On the waveplate layer LW-PW according to an embodiment of the present invention, n lens wavelength layers (LW-1, LW-2, . . . LW-n) are m phase distortion wave layers (PW-1, PW-2, . . . PW-m) are stacked in order. Here, odd-numbered lens wavelength layers (e.g., LW-1) and even-numbered lens wavelength layers (e.g., LW-2) are disposed adjacent to each other, and odd-numbered phase distortion layers (e.g., PW-1) and even-numbered phase distortion wave layers (e.g., PW-2) are disposed adjacent to each other.

Meanwhile, the lens waveplate LW is stacked in order and then the phase distortion waveplate PW is stacked in order in FIG. 1, but there is no limit to the stacking order and number of the lens waveplate LW and the phase distortion waveplate PW. For example, a waveplate layer LW-PW may be formed by stacking the phase distortion waveplate PW between the lens waveplates LW or alternately stacking the lens waveplate LW and the phase distortion waveplate PW.

Meanwhile, the thickness of the waveplate layer LW-PW may be smaller than the wavelength of the incident light, equal to the wavelength of the incident light, or larger than the wavelength of the incident light. In addition, the thicknesses of the lens waveplate LW and phase distortion waveplate PW included in each waveplate layer LW-PW may be the same or different.

FIG. 3 illustrates the phase distribution of a lens waveplate according to an embodiment of the present invention, FIG. 4 illustrates the overall phase distribution of the lens waveplate shown in FIG. 3, FIG. 5 illustrates the phase distribution of a phase distortion waveplate according to an embodiment of the present invention, FIG. 6 illustrates the phase distribution of a phase distortion waveplate according to another embodiment of the present invention, and FIG. 7 illustrates the phase distribution of a phase distortion waveplate according to still another embodiment of the present invention.

First, the phase distribution of the lens waveplate LW of the present invention is examined. FIG. 3 illustrates a phase distribution representing a phase difference of light ray passing through a position separated by a radius r with respect to the center of an optical axis (point at r=0) in a transmitted wavefront incident on the lens waveplate LW. The phase difference distribution shown in FIG. 3 is within the wavelength range of incident light and has a sawtooth cross-section. FIG. 3 illustrates only half of the phase distribution based on the center of the lens 100.

Graph (a) of FIG. 3 represents the phase distribution shown in the odd-numbered lens waveplate LW, and graph (b) of FIG. 3 represents the phase distribution shown in the even-numbered lens waveplate LW. Examining the phase distribution, a point where the phase suddenly changes (changing from $+\pi$ to $-\pi$ or $-\pi$ to $+\pi$) appears as the radius increases. In FIG. 3, points where the phase suddenly changes in the phase distribution of the odd-numbered lens waveplate LW appear as P1 to Pn, and points where the phase changes suddenly in the phase distribution of the even-numbered lens waveplate LW appear as P1' to Pn'. The phase position Pn corresponds to the position of $r_j$ in Equation 1. Here, a phase section from the center (r=0) to P1 is called X1 section, and a phase section from the center (r=0) to P1' is called X1' section. Although not shown in FIG. 3, the phase sections up to P2 and P2 based on the center (r=0) are called X2 and X2' sections, respectively, and the following phase sections may be displayed in the above-described manner. In this description, a phase section from X1 and thereafter and a phase section from X1 and thereafter are collectively referred to as X section.

When examining the phase distribution according to an embodiment of the present invention while referring to FIG. 3 again, the phase at the even-numbered waveplate LW decreases whereas the phase at the odd-numbered lens waveplate LW increases as the distance from the radius center increases in the same phase section (X). That is, the phase sign ($+\Phi$) of the odd-numbered waveplate LW and the phase sign ($-\Phi$) of the even-numbered waveplate LW (LW) should be opposite to each other. In this description, this relationship is called a complementary relation. Here, the value (absolute value) of the phase magnitude may be the same or different.

Here, if the lens waveplate LW is manufactured such that the spacing of the X section varies, the position where the focal point is formed can be adjusted. Specifically, referring to FIG. 3 and Equation 1, the phase value and phase position (Pn or rj) within a range of $-\pi$ to $+\pi$ are determined when one lens waveplate LW is manufactured, and when the lens waveplate LW is manufactured so that the interval of the X section changes, the phase position (Pn or rj) changes and the focal length (F in Equation 1) also changes. For example, the focal distance also decreases as the interval between X sections decreases.

FIG. 4 illustrates the phase distribution of the entire lens waveplate LW.

According to another embodiment of the present invention, in the same phase section (X), the phase at the odd-numbered lens waveplate LW may decrease, and the phase at the even-numbered lens waveplate LW may increase.

Next, the phase distribution of the phase distortion waveplate PW is examined. FIG. 5 illustrates a phase distribution representing a phase difference of light ray passing through a position separated by a radius r with respect to the center of the optical axis (r=0) in the transmitted wavefront incident on the phase distortion waveplate PW. Examining the phase difference distribution shown in FIG. 5, it is within a wavelength range of incident light, a constant phase appears in the central area of the cross-section, and a sawtooth-shaped phase appears in other areas.

Graph (a) of FIG. 5 illustrates phase distribution shown in the odd-numbered phase distortion waveplate PW, and graph (b) of FIG. 5 illustrates phase distribution shown in the even-numbered phase distortion waveplate PW. The analysis of the phase distribution is the same as described for the lens waveplate LW described above.

In the central regions of the odd-numbered phase distortion waveplate PW and the even-numbered phase distortion waveplate PW, a phase value and a phase sign are not important. That is, a phase difference between the neighboring phase distortion waveplate PW in the center area is $\pi-(-\pi)=2\pi(360°)$. This is because the light passing through the phase distortion waveplate PW has the same effect as if there is no phase difference.

However, in the remaining areas except for the center area, the odd-numbered phase distortion waveplate PW and the even-numbered phase distortion waveplate PW should satisfy a complementary relation. That is, a phase sign (+Φ) in the odd-numbered phase distortion waveplate PW and a phase sign (−Φ) in the even-numbered phase distortion waveplate PW should be opposite to each other. Alternatively, a phase slope in the odd-numbered phase distortion waveplate PW and a phase slope in the even-numbered phase distortion waveplate PW should be opposite to each other. Here, values (absolute value) of the phase magnitudes may be the same or different.

FIGS. 6 and 7 illustrate the phase distribution of the phase distortion waveplate PW according to another embodiment of the present invention. In FIGS. 6 and 7, a phase distribution on the X-Y plane of the phase distortion waveplate PW is expressed as a contrast difference, and a phase distribution value on the X-Z plane is expressed within a range of −π to +π. When the phase distribution degree of the phase distortion waveplate PW is expressed in Equation 1, it is divided into five regions (radius center ~r1, r1~r2, r3~r4, r4~rest) with different F values depending on the radius r. Here, the phase has a constant value in the area from the center of the phase distortion waveplate PW to the radius r1, and the phase distribution in the remaining areas is structured slightly differently. As described above, the phase distribution in regions other than the central region in the phase distortion waveplate PW shown in FIGS. 6 and 7 is in a complementary relation.

Referring to FIG. 1 again, a last lens waveplate LW-n of a lens waveplate layer LW and a first phase distortion waveplate PW-1 of a phase distortion waveplate layer PW are adjacent to each other, and thus, should satisfy a complementary relation.

Hereinafter, to examine the effect of the extended depth-of-focus lens having multiple waveplates according to the present invention, a case where one lens waveplate LW is disposed and a case where the phase distribution is not in a complementary relation and lens waveplates LW are disposed next to each other are compared with the extended depth-of-focus lens having multiple waveplates according to the present invention.

FIG. 8 illustrates a state in which one lens waveplate is disposed on a lens, and FIG. 9 illustrates the focal point locations and light intensity distribution depending upon a thickness change of the lens waveplate of FIG. 8.

Referring to FIGS. 8 and 9, when the lens waveplate LW is disposed as a single layer on the lens 100, three focal points F-1, F-2 and F-3 are generated for linearly polarized incident light. Here, when the thicknesses of the waveplates are λ/2, λ/3, and λ/4, the light intensity appears at each focal point location. As such, in the case of a multi-focal point lens in which the lens waveplate LW is arranged in a single layer on the lens 100, the total number of focal points is limited to a maximum of three. Meanwhile, it can be seen that when the thickness of the lens waveplate LW changes, the light intensity at the focal point location changes.

FIG. 10 illustrates a state where two lens waveplates are stacked and disposed on a lens, but not in complementary relation, and FIG. 11 illustrates the locations and light intensity distribution of focal points when each thickness of the waveplate of FIG. 10 is λ/4.

Referring to FIGS. 10 and 11, two lens waveplates LW-1 and LW-2 are stacked and disposed on the lens 100. Here, the lens waveplates LW-1 and LW-2 are disposed next to each other, but the phase distribution in each of the lens waveplates is not in a complementary relation. In addition, when the thickness of each waveplate is λ/4, the total thickness is λ/2. This is a case where the thickness of the lens waveplate LW is λ/2, and the total number of focal points is limited to a maximum of 3 (see FIG. 9(*b*)).

When multiple lens waveplates LW that do not have a complementary relation are disposed on the lens 100, the maximum number of focal points may be obtained as in Equation 3 below:

$$N=2m+1 \quad \text{<Equation 3>}$$

where N represents the number of focal points and m represents the number of lens waveplates.

In addition, Equation 3 may also be applied when one lens waveplate is disposed on the lens L.

FIG. 12 illustrates a state in which two lens waveplates in a complementary relationship are stacked and disposed on a lens, and FIG. 13 illustrates the location of focal points and light intensity distribution when each thickness of the waveplates of FIG. 12 is λ/4.

Referring to FIGS. 12 and 13, two lens waveplates LW-1 and LW-2 are stacked and disposed on the lens 100. Here, the lens waveplates LW-1 and LW-2 are disposed next to each other, and the phase distribution of each of the waveplate is in a complementary relation. In addition, when the thickness of each of the lens waveplates LW-1 and LW-2 is λ4, the overall total thickness is λ/2. In FIG. 12, multiple focal points F-1, F-2, . . . F-M are formed.

As such, when a plurality of lens waveplates, which are in a complementary relation, are disposed on the lens 100, the number of maximum focal points increases.

Meanwhile, when the lens waveplates LW-1 and LW-2 neighboring each other have a complementary relation as described above, the size of the phase may be different. Here, when the size of the phase is different, the value of light intensity may vary without changing the number of focal points.

When multiple lens waveplates LW with a complementary relation are disposed on the lens L, the maximum number of focal points may be obtained as in Equation 4 below:

$$N4\times2^{m-}1 \quad \text{<Equation 4>}$$

where N represents the number of focal points and m represents the number of lens waveplates.

The value calculated by Equation 4 is the number of maximum focal points. By adjusting the thickness of the lens waveplate LW, i.e., by controlling the light intensity at each focal point location, the number of focal points may be determined by limiting the number of maximum focal points. For example, when two lens waveplates LW-1 and LW-2, which are in a complementary relation, are disposed on the lens 100 according to one embodiment of the present invention, seven focal points are formed according to Equation 4, and the same effect as disappearing the focal point at that location may be obtained by adjusting the thickness of one or more of the lens waveplate LWs to set the light intensity at at least one focal point location to 0, so that it is possible to reduce the total number of focal points.

Meanwhile, a method of predicting the light intensity at the focal point location is as follows. Specifically, when right-handed circular polarization or left-handed circular polarization is incident on the lens waveplate LW, a conversion efficiency to polarization in the opposite direction may be obtained as in Equation 5 below:

$$\eta(\lambda)=\sin^2\left(\frac{\Gamma}{2}\right) \quad \text{⟨Equation 5⟩}$$

Here $$\Gamma = \frac{2\pi}{\lambda}\Delta nd$$

means phase lag (phase change of incident light). A represents the wavelength of incident light, Δn represents the birefringence of the waveplate, and d represents the thickness of the waveplate.

In incident light that is linearly polarized, right-handed circular polarization and left-handed circular polarization are present in the same ratio. When linearly polarized light is incident on the lens waveplate LW, the direction of circularly polarized light included in the incident light changes. For example, right-handed circular polarization included in linearly polarized light changes to left-handed circular polarization. That is, as linearly polarized light passes through the lens waveplate LW, left-handed circular polarization and right-handed circular polarization have opposite signs and experience geometric phase lag. Here, the remaining light that is not converted while passing through the lens waveplate LW is not affected by geometric phase lag and passes through the lens waveplate LW as linearly polarized light. Equation 5 represents the efficiency (called polarization conversion efficiency) of passing through the lens waveplate LW without being polarized, and the light intensity at the location where each focal point is formed is affected by polarization-changed efficiency. Here, it can be seen that polarization-changed efficiency varies depending on the thickness of the lens waveplate LW.

Even when multiple lens waveplates LW are arranged, the light intensity at the location where each focal point is formed may be sufficiently predicted using Equation 5.

Meanwhile, when the lens waveplate LW is disposed on the lens 100, a method of determining the focal point location is as follows. For explanation, FIGS. 8 and 9 are referred to again. As shown in FIG. 8, when one lens waveplate LW is present, the number of focal points are three (F-1, F-2, F-3) according to Equation 3 (or Equation 4). Meanwhile, when the thickness of the lens waveplate LW is a thickness that provides a half-wavelength phase lag, linearly polarized light is not generated, so there are two focal points (see FIG. 6(*a*)).

The location of each focal point may be obtained as in Equation 6 below:

$$\frac{1}{f_{1,2,3}} = \frac{1}{f_{FL}} + \frac{1}{f_{LW-1}} \quad \langle\text{Equation 6}\rangle$$

where $f_{1,2,3}$ represents a focal distance at F-1, F-2, and F-3 after passing through the lens waveplate, $f_{FL}$ represents a focal distance of the refractive lens, and $f_{LW-1}$ represents a focal distance of the lens waveplate.

With regard to the focal distance $f_{LW-1}$ of the lens waveplate LW, when the incident light is circularly polarized and passes through the lens waveplate LW as described above, the sign changes while experiencing phase lag. Accordingly, when a focal distance due to right-handed circular polarization is $+f_{LW-1}$, a focal distance due to left-handed circular polarization is $-f_{LW-1}$. When left-handed circular polarization and right-handed circular polarization pass through the lens waveplate LW, they are converted into circular polarization with opposite signs, which means that the lens waveplate LW functions like a convex lens for one circularly polarized light and like a concave lens for the other circularly polarized light. Meanwhile, when the incident light is linearly polarized light, a focal distance is infinite.

Equation 6 is a formula for calculating three focal distances by one lens waveplate LW. However, when multiple lens waveplates LW are arranged, each focal distance formed by the lens waveplates LW may be calculated by repeating Equation 6 as many times as the number of the lens waveplates LW. Specifically, when one lens waveplate LW-2 is further added in the state of FIG. 8, each focal distance may be obtained by further adding $$\frac{1}{f_{WL-2}}$$

to the right side of Equation 6. Here, the increased number of foci may be obtained by Equation 4 above. Generalizing this, it is as shown in Equation 7 below:

$$\frac{1}{f_N} = \frac{1}{f_{FL}} + \frac{1}{f_{LW-1}} + \frac{1}{f_{LW-2}} + \dots \frac{1}{f_{LW-n}} \quad \langle\text{Equation 7}\rangle$$

where $f_N$ represents a focal distance after passing the last lens waveplate, and $f_{LW-n}$ represents a focal distance of each lens waveplate.

According to an embodiment of the present invention, when the multiple lens waveplates LW, which are in a complementary relation, are disposed on the lens 100, a focal point may be formed in space. That is, it can be confirmed that focal points are created not only in the Z-axis direction but also spatially.

FIG. 14 illustrates a state in which one lens waveplate and one phase distortion waveplate are stacked and disposed on a lens according to an embodiment of the present invention, FIG. 15(*a*) illustrates the light intensity distribution when only one lens waveplate is disposed on a lens, FIG. 15(*b*) illustrates the light intensity distribution when one lens waveplate and one phase distortion waveplate, which are not in a complementary relation, are disposed on a lens, and FIG. 15(*c*) illustrates the light intensity distribution when one lens waveplate and one phase distortion waveplate which are in complementary relation are disposed on a lens.

As shown in FIG. 14, when the lens waveplate LW and the phase distortion waveplate PW are disposed on the lens 100, the incident light passes through the lens waveplate LW and the phase distortion waveplate PW and then an extended depth of focus (EDOF) is formed. That is, multiple focal points are formed by the lens waveplate LW, and focal points formed by the phase distortion waveplate PW are connected.

FIG. 15(*a*) illustrates the light intensity distribution when only one lens waveplate LW is disposed on the lens 100. In FIG. 15(*a*), three focal points (F-1, F-2, F-3) are formed discontinuously within a distance of approximately 40 mm to 60 mm. That is, when only the lens waveplate LW is disposed, the number of focal points may increase, but the focal points are not connected continuously.

FIG. 15(*b*) illustrates the light intensity distribution when one lens waveplate LW and one the phase distortion waveplate PW are disposed in the lens 100. Here, the lens waveplate LW and the phase distortion waveplate PW do not have a complementary relation. Here, Here, the number of focal points generated is as shown in (a) of FIG. 15, but the depth of focus (EDOF) is formed between approximately 45 mm and 55 mm distance.

FIG. 15(*c*) illustrates the light distribution when one lens waveplate LW and one phase distortion waveplate intensity PW are disposed in the lens 100. Here, the lens waveplate LW and the phase distortion waveplate PW have a complementary relation. Here, the number of focal points generated is as shown in FIG. 15(*a*), but the depth of focus EDOF is formed between approximately 41 mm and 60 mm distance. That is, if the neighboring lens waveplate LW and the phase distortion waveplate PW are in a complementary relationship, the depth of focus EDOF has the effect of expanding.

FIG. 16 illustrates various embodiments of the present invention in which a lens waveplate and a phase distortion waveplate are disposed on a lens.

Referring to FIG. 16, a waveplate layer LW-PW may be arranged in various forms depending on the shape and number of lenses 100. Here, a complementary relation between neighboring waveplates (between lens waveplates or between phase distortion waveplates or between a lens waveplate and a phase distortion waveplate) should be satisfied.

First, a case wherein a waveplate layer LW-PW is placed on one lens 100 is examined.

Referring to FIG. 16(*a*), an incident surface of the lens 100 is flat and an opposite surface thereof has a curved surface according to one embodiment of the present invention. Here, the waveplate layer LW-PW may have a shape corresponding to the flat shape, may be stacked in order, and may be disposed on an incident surface of the lens 100.

Here, according to another embodiment of the present invention, the waveplate layer LW-PW may have a shape corresponding to the curved shape of the lens 100 and may be stacked and disposed in order on the opposite side of the lens 100.

As another embodiment of the present invention, an incident surface of the lens 100 may be a curved surface and an opposite surface thereof may be formed as a flat surface. Here, two or more waveplate layers LW-PW may have a shape corresponding to the curved shape of an opposite surface of the lens 100 and may be stacked and disposed in order on an incident surface of the lens 100, or may have a flat shape corresponding to an opposite surface of the lens 100 and may be stacked and disposed in order on the opposite side of the lens 100.

As another embodiment of the present invention, one or more waveplate layers among the waveplate layers may be disposed on an incident surface (curved or flat surface) of the lens 100, and the remaining one or more waveplates may be disposed on the opposite surface thereof (flat surface or curved surface).

Meanwhile, referring to FIG. 16(*f*), the incident and opposite surfaces of the lens 100 may be formed as curved surfaces as another embodiment of the present invention. Here, the curved surface of the incident surface of the lens 100 is called a first curved surface, and the curved surface of an opposite surface thereof is called a second curved surface. Here, the curvatures of the first curved surface and the second curved surface may be different or the same. Here, one or more waveplate layers among the waveplate layers may be disposed on the incident surface of the lens 100 to have a shape corresponding to the first curved shape, and the remaining waveplate layers may be disposed on the opposite surface of the lens 100 with the second curved shape to have a shape corresponding to the second curved shape.

Next, a case wherein a waveplate layer is disposed on two lenses 100 is examined.

According to another embodiment of the present invention, the lens 100 includes a first lens whose incident surface has a curved shape and whose opposite surface thereof has a flat shape (e.g., the left lens of FIG. 16(*b*)); and a second lens (e.g., the right lens of FIG. 16(*b*)) wherein a surface facing the first lens has a flat shape and an opposite surface thereof has a curved shape. Here, when the curved surface of the first lens is a third curved surface and the curved surface of the second lens is a fourth curved surface, the curvatures of the third curved surface and the fourth curved surface may be the same or different.

Referring to FIG. 16(*b*), the waveplate layer according to an embodiment of the present invention may be disposed between a flat surface where the first lens and the second lens face each other.

Meanwhile, the waveplate layer is disposed at one or more locations of the first location, which is an incident surface of the first lens, the second location, which is between the first and second lenses, and the third location, which is the opposite surface of the second lens. Here, the waveplate layers disposed at the first location and the third location may respectively have shapes corresponding the shapes of the third and fourth curved surfaces as described above.

Referring to FIG. 16(*c*), the waveplate layer may be disposed at any of the first to the third locations according to another embodiment of the present invention. FIG. 16(*c*) illustrates a state in which the waveplate layer is disposed at all of the first to third locations.

However, the waveplate layer may be disposed at at least one of the first to third locations. For example, the waveplate layer may be disposed at the second and third locations as shown in FIG. 16(*d*), or the waveplate layer may be disposed at only the first and second locations as shown in FIG. 16(*e*).

Meanwhile, although FIGS. 16(*b*) to (*e*) illustrate a state composed of two lenses 100, three or more lenses 100 may be included. Here, it is natural that the waveplate layer may be disposed anywhere in the optical axis direction of the lenses.

According to another embodiment of the present invention, the waveplate layer LW-PW may not be formed on the lens 100, and the lens waveplate LW and the phase distortion waveplate PW may be arranged to be spaced apart from each other with the lens 100 interposed therebetween. For example, one or more lens waveplates LW may be disposed on the incident surface of the lens 100, and one or more phase distortion waveplates PW may be disposed on the opposite surface thereof. However, even in this case, the phases of neighboring waveplates should satisfy a complementary relation.

Meanwhile, the number of the lens waveplates LW or phase distortion waveplates PW disposed on the lens 100 may be appropriately adjusted considering the number of focal points and the depth of focus.

Meanwhile, in the present invention, the total number of the waveplates, the curvature of the refractive lens surface, the refractive index distribution of each waveplate, and the like may be varied to achieve the refractive compensation required for distance and near vision with other lenses in the visual system.

Although the present invention has been described with reference to embodiments shown in the accompanying drawings, the embodiments are provided as only exemplary examples, and those skilled in the art will understand that various modifications and equivalent embodiments are possible therefrom. Therefore, the true technical protection scope of the present invention should be determined by the technical spirit of the appended claims.

The invention claimed is:

1. An extended depth-of-focus lens having multiple waveplates, the extended depth-of-focus lens comprising:

a lens having an incident surface and an opposite surface thereof;

one or more lens waveplates made of a birefringent material, and disposed on the lens in a direction of a central axis of the lens, wherein each lens waveplate comprises an anisotropic material having an optical axis rotation pattern that varies at local locations, wherein, when circularly polarized incident light passes through the lens waveplate, a sign of a phase change experienced by the incident light changes depending on handedness of the circular polarization such that the lens waveplate functions as a convex lens for one handedness of circular polarization and as a concave lens for an opposite handedness of circular polarization, thereby increasing a number of focal points, wherein one or more phase distortion waveplates are made of a birefringent material, and disposed on the lens in a direction of a central axis of the lens to have a phase distribution to extend a depth of focus, and wherein phases of adjacent waveplates among the one or more lens waveplates and the one or more phase distortion waveplates have opposite phase signs such that each pair of adjacent waveplates is in a complementary relation.

2. The extended depth-of-focus lens according to claim 1, wherein light intensity at a point where a focal point is formed changes as thicknesses of at least one of the one or more lens waveplates or at least one of the one or more phase distortion waveplates change.

3. The extended depth-of-focus lens according to claim 2, wherein, when a thickness of at least one of the one or more lens waveplates or at least one of the one or more phase distortion waveplates is adjusted such that light intensity at a location where one focal point is formed becomes 0, the number of focal points changes.

4. The extended depth-of-focus lens according to claim 1, wherein the number of focal points generated by the lens, the one or more lens waveplates and the one or more phase distortion waveplates is calculated by Equation 1 below:

$$N=4\times 2^{m-1}-1 \quad \text{<Equation 1>}$$

where N represents the number of focal points, and m represents a number of lens waveplates.

5. The extended depth-of-focus lens according to claim 1, wherein a position of a focal point generated by the lens, the one or more lens waveplates and the one or more phase distortion waveplates is calculated according to Equation 2 below depending upon a number of waveplates:

$$\frac{1}{f_N}=\frac{1}{f_{FL}}+\frac{1}{f_{LW-1}}+\frac{1}{f_{LW-2}}+\ldots\frac{1}{f_{LW-n}} \quad \text{(Equation 2)}$$

where $f_N$ represents a focal distance after passing a last lens waveplate, and $f_{LW-n}$ represents a focal distance of each lens waveplate.

6. The extended depth-of-focus lens according to claim 1, wherein, in a phase distribution of at least one of the one or more lens waveplates or at least one of the one or more phase distortion waveplates, a location where a focal point is formed changes as a phase section X between a center of the lens and points where a phase rapidly changes is changed.

7. The extended depth-of-focus lens according to claim 1, wherein in the same phase section (X) between neighboring lens waveplates, between phase distortion waveplates or between a lens waveplate and a phase distortion waveplate adjacent waveplates among the one or more lens waveplates and the one or more phase distortion waveplates, a section where a phase at another waveplate decreases appears when a phase at one waveplate increases.

8. The extended depth-of-focus lens according to claim 1, wherein, in a phase distribution of at least one of the one or more phase distortion waveplates, a phase is consistently formed in a phase section (X1) between a center of the lens and a point where a first phase changes rapidly.

9. The extended depth-of-focus lens according to claim 1, wherein two or more lens waveplates or phase distortion waveplates are stacked and disposed.

10. The extended depth-of-focus lens according to claim 1, wherein the one or more lens waveplates and the one or more phase distortion waveplates are alternately disposed.

11. The extended depth-of-focus lens according to claim 1, wherein at least one of the one or more lens waveplates or at least one of the one or more phase distortion waveplates is disposed on the incident surface or the opposite surface of the lens having a curved shape and has a shape corresponding to the curved shape.

12. An extended depth-of-focus lens having multiple waveplates, the extended depth-of-focus lens comprising:

a lens having an incident surface and an opposite surface thereof; and one or more waveplate layers made of a birefringent material and disposed on the lens in a direction of a central axis of the lens, each waveplate layer comprising:

one or more lens waveplates for increasing a number of focal points, wherein each lens waveplate comprises an anisotropic material having an optical axis rotation pattern that varies at local locations, wherein, when circularly polarized incident light passes through the lens waveplate, a sign of a phase change experienced by the incident light changes depending on handedness of the circular polarization such that the lens waveplate functions as a convex lens for one handedness of circular polarization and as a concave lens for an opposite handedness of circular polarization, wherein one or more phase distortion waveplates are stacked on the one or more lens waveplates and have a phase distribution for extending a depth of focus, and wherein, in each waveplate layer, phases of adjacent waveplates among the one or more lens waveplates and the one or more phase distortion waveplates have opposite phase signs such that each pair of adjacent waveplates is in a complementary relation.

13. The extended depth-of-focus lens according to claim 12, wherein, when a waveplate layer of the one or more waveplate layers is disposed on both the incident surface of the lens and the opposite surface thereof, phases of lens waveplates, phase distortion waveplates or a lens waveplate and a phase distortion waveplate facing each other in each waveplate layer with the lens interposed therebetween have opposite phase signs such that they are in a complementary relation.

14. The extended depth-of-focus lens according to claim 12, wherein the lens comprises:

a first lens whose incident surface has a curved shape and whose opposite surface has a flat shape; and a second lens whose surface facing the first lens has a flat shape and whose opposite surface has a curved shape, wherein the one or more waveplate layers are disposed at one or more positions selected from: on an incident surface of the first lens, between the first and second lenses, and on an opposite surface of the second lens.

15. The extended depth-of-focus lens according to claim 14, wherein, among the one or more waveplate layers, one or more waveplate layers are disposed on the incident surface of the first lens, and remaining one or more waveplate layers are disposed between the first and second lenses or on the opposite surface of the second lens.

16. The extended depth-of-focus lens according to claim 14, wherein, among the one or more waveplate layers, one or more waveplate layers are disposed between the first and second lenses, and remaining one or more waveplate layers are disposed on the opposite surface of the second lens.

* * * * *